(12) United States Patent
Nakano

(10) Patent No.: US 12,273,488 B2
(45) Date of Patent: Apr. 8, 2025

(54) INFORMATION PROCESSING DEVICE, INFORMATION PROCESSING METHOD, AND STORAGE MEDIUM

(71) Applicant: CANON KABUSHIKI KAISHA, Tokyo (JP)

(72) Inventor: Yu Nakano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/938,302

(22) Filed: Oct. 5, 2022

(65) Prior Publication Data
US 2023/0111344 A1 Apr. 13, 2023

(30) Foreign Application Priority Data
Oct. 7, 2021 (JP) ................................. 2021-165582

(51) Int. Cl.
*G06F 15/00* (2006.01)
*H04N 1/00* (2006.01)

(52) U.S. Cl.
CPC ..... *H04N 1/00209* (2013.01); *H04N 1/00424* (2013.01)

(58) Field of Classification Search
CPC ....................... H04N 1/00209; H04N 1/00424
USPC ........................................................ 358/1.15
See application file for complete search history.

(56) References Cited

U.S. PATENT DOCUMENTS

| | | | | |
|---|---|---|---|---|
| 5,335,084 | A * | 8/1994 | Munemasa | H04N 1/46 358/403 |
| 8,149,440 | B2 * | 4/2012 | Uchikawa | H04L 67/51 358/1.18 |
| 8,830,333 | B2 * | 9/2014 | Amano | H04N 1/00278 358/1.15 |
| 8,988,722 | B2 * | 3/2015 | Hashimoto | H04N 1/00129 358/1.15 |
| 2009/0067003 | A1 * | 3/2009 | Haruta | G06F 3/1244 358/1.16 |
| 2011/0188076 | A1 * | 8/2011 | Maeda | H04N 1/32058 358/1.15 |
| 2014/0168696 | A1 * | 6/2014 | Matsuhara | H04N 1/00307 358/1.14 |
| 2015/0043036 | A1 * | 2/2015 | Kamma | G06F 3/121 358/1.15 |
| 2016/0335351 | A1 * | 11/2016 | Volkovs | G06F 16/22 |
| 2021/0406211 | A1 * | 12/2021 | Maeda | G06F 13/385 |

FOREIGN PATENT DOCUMENTS

JP 2019165381 A 9/2019

* cited by examiner

*Primary Examiner* — Mark R Milia
(74) *Attorney, Agent, or Firm* — Canon U.S.A., Inc. IP Division

(57) ABSTRACT

An information processing device configured to transmit an image to an information management service includes a display control unit configured to display information indicating the information management service as a transmission destination of the image, and a transmission unit configured to transmit the image to the information management service in accordance with an operation performed by a user. The display control unit displays the information indicating the information management service differently in accordance with information about the user.

12 Claims, 18 Drawing Sheets

FIG.3

| USER ID | MAIL ADDRESS | REGISTRATION DATE | CONNECTED SERVICE |
|---|---|---|---|
| user_001 | user_001@mail1.com | 2020-12-01 | service_001 |
| user_002 | user_002@mail2.com | 2010-02-20 | — |
| user_003 | user_003@mail3.com | 2017-05-13 | service_001, service_003 |

FIG.5

| USER ID (301) | IMAGE ID (501) | IMAGE FORMAT (502) | IMAGE REGISTRATION DATE (503) |
|---|---|---|---|
| user_001 | image_001 | format_001 | 2018-02-22 |
| user_001 | image_002 | format_001 | 2018-02-22 |
| user_001 | image_003 | format_001 | 2018-02-22 |
| user_001 | image_004 | format_001 | 2018-02-22 |
| user_001 | image_005 | format_001 | 2018-02-22 |
| user_001 | image_006 | format_001 | 2018-02-22 |
| user_001 | image_007 | format_001 | 2018-02-22 |
| user_001 | image_008 | format_001 | 2018-02-22 |
| user_001 | image_009 | format_002 | 2018-02-22 |
| user_001 | image_010 | format_003 | 2018-02-22 |

FIG.9A

```
         START
           │
           ▼           ┌─S901
  ┌─────────────────┐
  │ ACQUIRE INFORMATION │
  │   ABOUT SERVICE  │
  └─────────────────┘
           │
           ▼       ┌─S902
         ╱╲
        ╱  ╲
       ╱ IS ╲
      ╱PRIORITY╲  NO
     ╱ FORMAT  ╲─────┐
     ╲ADAPTABLE╱     │
      ╲TO TRANS╱     │
       ╲MISSION╱     │
        ╲?╱         │
         ▼YES  ┌─S903│
  ┌─────────────────┐│
  │ SET DISPLAY PRIORITY│
  │ OF TRANSMISSION │
  │ DESTINATION TO HIGH│
  └─────────────────┘
           │         │
           ▼         │
         ╱╲    ┌─S904│
        ╱  ╲         │
       ╱ IS ALL╲  NO │
      ╱TRANSMISSION╲─┘
      ╲DESTINATIONS╱
       ╲CHECKED?╱
         ╲╱
          │YES
          ▼
         END
```

FIG.9B

```
{
  "services":[
    {
      "id": "service_001",
      "name": "service_name_001",
      "priority": 1
    },
    {
      "id": "service_002",
      "name": "service_name_002",
      "priority": 0
    },
    {
      "id": "service_003",
      "name": "service_name_003",
      "priority": 1
    }
  ]
}
```

```
{
  "user_image_count":1000,
  "services":[
    {
      "id": "service_001",
      "name": "service_name_001",
      "priority": 1,
      "uploadable_image_count": 900
    },
    {
      "id": "service_002",
      "name": "service_name_002",
      "priority": 0,
      "uploadable_image_count": 134
    },
    {
      "id": "service_003",
      "name": "service_name_003",
      "priority": 1,
      "uploadable_image_count": 500
    }
  ]
}
```

FIG.14A

| USER ID 301 | MAIL ADDRESS 302 | REGISTRATION DATE 303 | CONNECTED SERVICE 304 | PRIORITY FORMAT 1401 |
|---|---|---|---|---|
| user_001 | user_001@mail1.com | 2020-12-01 | service_001 | format1 |
| user_002 | user_002@mail2.com | 2010-02-20 | — | format2 |
| user_003 | user_003@mail3.com | 2017-05-13 | service_001, service_003 | format2, format3 |

FIG.14B

| USER ID 301 | SERVICE ID 601 | DISPLAY PRIORITY 1402 |
|---|---|---|
| user_001 | service_001 | high |
| user_001 | service_002 | low |
| user_001 | service_003 | low |

```
{
  "user_image_count": 1000,
  "enabled_service": {
    "id": "service_001",
    "name": "service_name_001",
    "uploadable_image_count": 134
  },
  "suggested_service": {
    "id": "service_002",
    "name": "service_name_002",
    "uploadable_image_count": 900
  }
}
```

INFORMATION PROCESSING DEVICE, INFORMATION PROCESSING METHOD, AND STORAGE MEDIUM

BACKGROUND OF THE DISCLOSURE

Field of the Disclosure

The present disclosure relates to an information processing device that transmits an image to an information management service, an information processing method, and a storage medium.

Description of the Related Art

An image management service that is provided via the Internet typically has a function for storing an image uploaded by a user and using the stored image. One example of the function is a cooperative function with another service. Examples of the other service include another image management service, a storage service, and a social networking service. One of the examples of the cooperative function is a function for transmitting an image to the other service. The user can select another service to which an image is transmitted to transmit a necessary image to the other service. The user can share the image with another user in the other service for further application of the image.

There may be a plurality of services that can be a target for the cooperative function, and thus the user needs to select a desired service from among the plurality of services. The respective services have respective properties, and the user has to select a service based on the properties. For example, each service has a different acceptable image type from each other, and the user needs to check whether the user can transmit the desired image before selecting the other service.

Japanese Patent Application Laid-Open No. 2019-165381 discusses a technique that determines a transmission destination of a file based on a storage space in another service. For example, in a case where a plurality of the other services are candidates of transmission destinations of the file, a service having a large space is determined as the transmission destination.

As described above, when selecting a service that is subject to the cooperative function, the user has to understand a difference in property of each service. To select a service appropriate for utilization of the user, the user has to consider the differences in the properties of each service.

In the technique discussed in Japanese Patent Application Laid-Open No. 2019-165381, however, the difference in property of each service is not considered. In a case where the user has not yet used any service, all the services as candidates have large space because the determination is made based on the storage space of the services. Thus, the user has to narrow down the candidates to a desired service. That is, in the conventional technique, the user cannot easily select a service that is subject to the cooperative function, and has to do complicated operations for understanding the properties of the plurality of services and finding a service appropriate for the utilization of the user.

SUMMARY OF THE DISCLOSURE

The present disclosure is directed to facilitating the selection of an information management service by a user in an information processing device that transmits an image to the information management service.

According to an aspect of the present disclosure, an information processing device configured to transmit an image to an information management service includes a display control unit configured to display information indicating the information management service as a transmission destination of the image, and a transmission unit configured to transmit the image to the information management service in accordance with an operation performed by a user. The display control unit displays the information indicating the information management service differently in accordance with information about the user.

Further features of the present disclosure will become apparent from the following description of exemplary embodiments with reference to the attached drawings.

BRIEF DESCRIPTION OF THE DRAWINGS

FIG. 3 illustrates a user management table according to the first exemplary embodiment.

FIG. 5 illustrates an image management table according to the first exemplary embodiment.

FIG. 9A is a flowchart of processing for determining display priority of transmission destinations according to the first exemplary embodiment. FIG. 9B illustrates a list of transmission destinations according to the first exemplary embodiment.

FIGS. 14A and 14B illustrate a user management table and a transmission destination priority management table according to the second exemplary embodiment.

DESCRIPTION OF THE EMBODIMENTS

Exemplary embodiments will now be described in detail with reference to the accompanying drawings. Configurations in the following exemplary embodiments are merely examples, and the present disclosure is not limited to the illustrated configurations.

Figure 1:
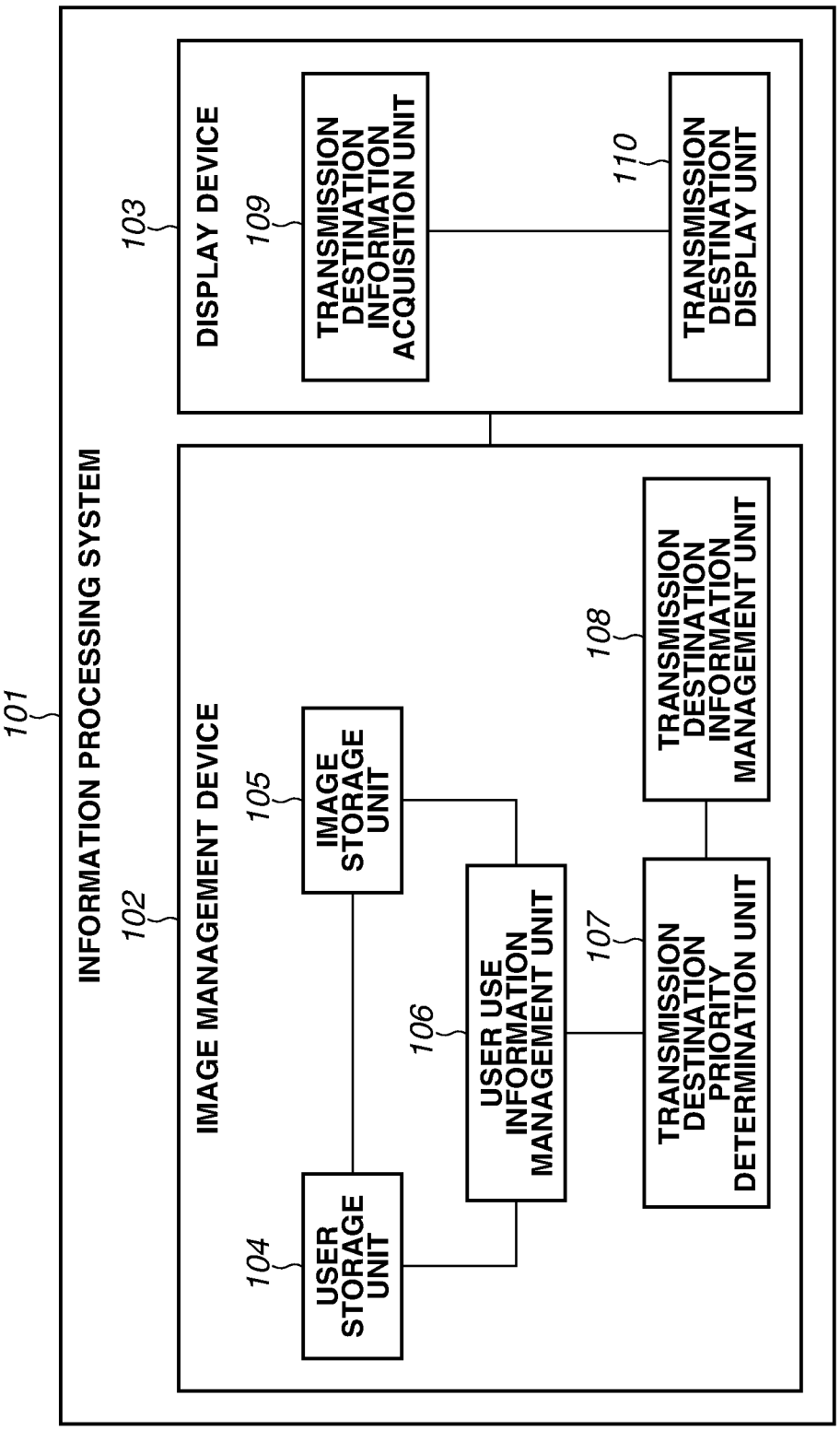
FIG. 1 is a block diagram illustrating a configuration of an information processing system according to a first exemplary embodiment.

A configuration of an information processing system according to a first exemplary embodiment will now be described with reference to FIG. 1.

An information processing system 101 according to the present exemplary embodiment includes an image management device 102 and a display device 103. The image management device 102 manages information about a user, an image, and a service to be an image transmission destination. The display device 103 displays the information acquired from the image management device 102.

The image management device 102 according to the present exemplary embodiment includes a user storage unit 104, an image storage unit 105, a user use information management unit 106, a transmission destination priority determination unit 107, and a transmission destination information management unit 108. The image management device 102 causes the user storage unit 104 to store information about a user of the information processing system 101. The image management device 102 causes the image storage unit 105 to store an image relating to the user. The image management device 102 causes the user use information management unit 106 to extract the information about the user based on the information acquired from the user storage unit 104 and the image storage unit 105. The image management device 102 causes the transmission destination information management unit 108 to manage information about a transmission destination with which the information processing system 101 can cooperate. The image management device 102 causes the transmission destination priority determination unit 107 to determine priority relating to display of the transmission destination.

The display device 103 according to the present exemplary embodiment includes a transmission destination information acquisition unit 109 and a transmission destination display unit 110. The display device 103 causes the transmission destination information acquisition unit 109 to acquire information about the transmission destination from the image management device 102. The display device 103 causes the transmission destination display unit 110 to display the information about the transmission destination. The display device 103 may be configured as a web browser or a program that operates in a mobile terminal.

The image management device 102 and the display device 103 exchange information via a network using a syntax according to a communication protocol. An example of the communication protocol is Hypertext Transfer Protocol (HTTP). Communication protocols other than HTTP may be used. As a format of information to be exchanged in accordance with the communication protocol, JavaScript Object Notation (JSON) is used. However, a format such as Extensible Markup Language (XML) may be used. The information may be exchanged off-line not via a network.

Figure 2:
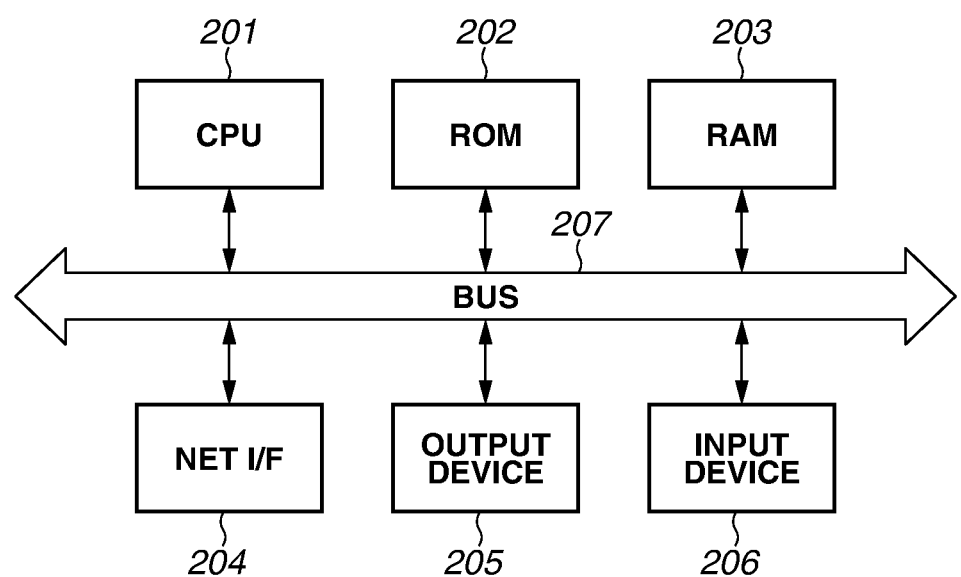
FIG. 2 is a block diagram illustrating a hardware configuration of the information processing system according to the first exemplary embodiment.

Representative hardware configurations of the image management device 102 and the display device 103 according to the present exemplary embodiment will now be described with reference to FIG. 2. As illustrated in FIG. 2, the hardware configuration includes a central processing unit (CPU) 201, a read only memory (ROM) 202, and a random access memory (RAM) 203. The hardware configuration further includes a network interface (NET I/F) 204, an output device 205, an input device 206, and a bus 207.

The CPU 201 controls the respective devices connected to the bus 207. The CPU 201 further executes various processing in the image management device 102 and the display device 103.

The ROM 202 stores, for example, an operating system that executes basic control of a computer, and an operation program.

The RAM 203 serving as a work memory of the CPU 201 stores the operation program itself and data used for the operation program.

The NET I/F 204 controls exchange of information with an external device connected via a network. In a case where the respective units of the image management device 102 and the display device 103 are achieved as individual hardware, the NET I/F 204 is used to transmit and receive data.

The output device 205 displays a processing result in the CPU 201. The output device 205 is configured by, for example, a liquid crystal display, and an organic electroluminescence (EL) display.

The input device 206 physically accepts an input from a user, and is configured by a keyboard, a mouse, or a touch panel. In a case where the input device 206 is a display mounted with a touch panel, the output device 205 and the input device 206 are configured to be integral with each other.

The output device 205 and the input device 206 can be used via the NET I/F 204 serving as external devices. In this case, the output device 205 and the input device 206 are not included.

Information managed by the user storage unit 104 according to the present exemplary embodiment will now be described with reference to FIGS. 3 and 4. The user storage unit 104 stores the information about the user of the information processing system 101 in a user management table illustrated in FIG. 3. The information about the user including a user ID 301 for uniquely identifying the user is stored in the user management table. The information about the user includes a mail address 302 and a registration date 303 as illustrated in the drawing, but information, such as a user name, other than the information illustrated in the drawing may be managed.

An identifier of a service for which cooperation is set to be enabled by the user is further stored as a connected service 304 in the user management table. An example illustrated in FIG. 3 indicates that, user_001 is enabled to cooperate with service_001, user_003 is enabled to cooperate with both service_001 and service_003, and user_002 has no service for which cooperation is enabled.

Figure 4:
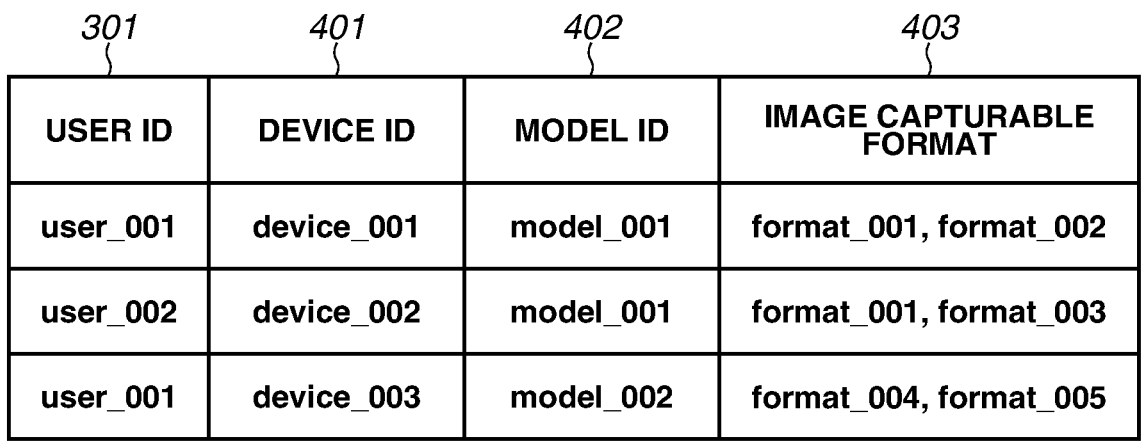
FIG. 4 illustrates a device management table according to the first exemplary embodiment.

The user storage unit 104 stores information about a device relating to the user of the information processing system 101 in a device management table illustrated in FIG. 4. The device management table stores a device ID 401 for uniquely identifying a device and the user ID 300 to maintain the association between the user and the device. The device management table also stores a model ID 402 indicating a model of the device and an image capturable format 403 indicating a type of an image capturable by the device.

The image capturable format 403 may store a value for making a type of an image identifiable, such as a value of an extension of an image file.

The user storage unit 104 has a function of adding, updating, and deleting information. The user storage unit 104 changes contents in the user management table and the device management table in accordance with a change in the user of the information processing system 101 or a change in the association between the user and the device.

Information that is managed by the image storage unit 105 according to the present exemplary embodiment will now be described with reference to FIG. 5. The image storage unit 105 stores information about an image stored in the information processing system 101, in an image management table. The user ID 301 relating to the image is stored in the image management table. An image ID 501 for uniquely identifying the image is also stored in the image management table. An image format 502 and an image registration date 503 are also stored in the image management table. Information illustrated in the drawing is an example, and information about a file size, a width, etc. of the image may be further stored. The image storage unit 105 may also include a file storage to store an image file. Alternatively, a file storage of another device may be used via a network.

The image storage unit 105 has a function of adding, updating, and deleting information about an image. The image storage unit 105 changes the contents of the image management table in accordance with addition or deletion of the image in the information processing system 101.

Figure 6:
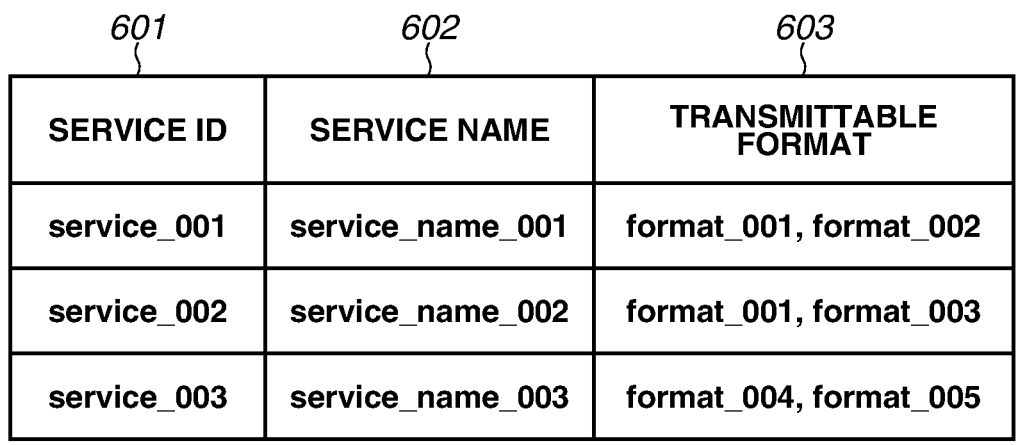
FIG. 6 illustrates a transmission destination management table according to the first exemplary embodiment.

Information that is managed by the transmission destination information management unit 108 according to the present exemplary embodiment will now be described with reference to FIG. 6. The transmission destination information management unit 108 stores information about a transmission destination with which the information processing system 101 can cooperate, in a transmission destination management table. The transmission destination includes information management services, such as an image management service and a storage service. The image management device 102 transmits an image to the transmission destination using a not illustrated image transmission unit.

The transmission destination management table stores a service ID 601 for uniquely identifying a transmission destination, a service name 602 indicating a service name, and a transmittable format 603 indicating a type of an image transmittable to a service. The transmittable format 603 may store a value that makes the type of an image identifiable, such as a value of an extension of an image file. In an example of FIG. 6, it is indicated that two types of image having format_001 or format_002 can be transmitted to service_001 serving as the transmission destination.

Figure 7:
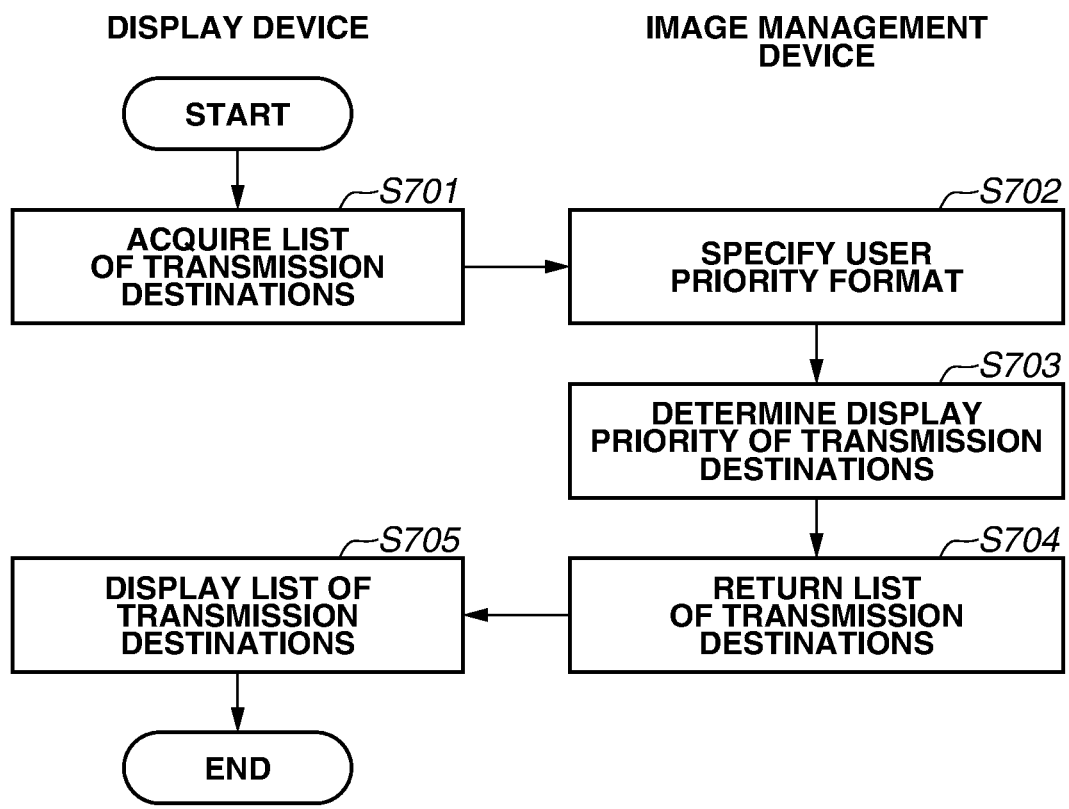
FIG. 7 is a flowchart of entire processing of the information processing system according to the first exemplary embodiment.

Specific processing for displaying a list of transmission destinations performed by the information processing system 101 according to the present exemplary embodiment will now be described with reference to FIG. 7.

(Step S701)

In step S701, the display device 103 requests the image management device 102 to transmit the list of the transmission destinations. The transmission destination information acquisition unit 109 of the display device 103 transmits a command indicating a request for the list of the transmission destinations and the user ID 301 of a target, to the image management device 102.

The information processing system 101 may be used only by an authenticated user. In this case, the display device 103 transmits user authentication information to the image management device 102, and then performs processing for checking validity of the authentication information.

(Step S702)

In step S702, the image management device 102 specifies a user priority format.

Processing in step S702 is performed by the user use information management unit 106 of the image management device 102. Details of the processing in step S702 will be described below.

(Step S703)

In step S703, the image management device 102 determines display priority of transmission destinations. Processing in step S703 is performed by using information about the format specified in step S702. Processing in step S703 is performed by the transmission destination priority determination unit 107 of the image management device 102. Details of the processing in step S703 will be described below.

(Step S704)

In step S704, the image management device 102 returns the list of the transmission destinations including information about the transmission destination priority determined in step S703 to the display device 103. Processing in step S704 is performed by the transmission destination priority determination unit 107 of the image management device 102. Details of the processing in step S704 will be described below.

(Step S705)

In step S705, the display device 103 display the list of the transmission destinations returned in step S704. Processing in step S705 is performed by the transmission destination display unit 110 of the display device 103. Details of the processing in step S705 will be described below.

Figure 8:
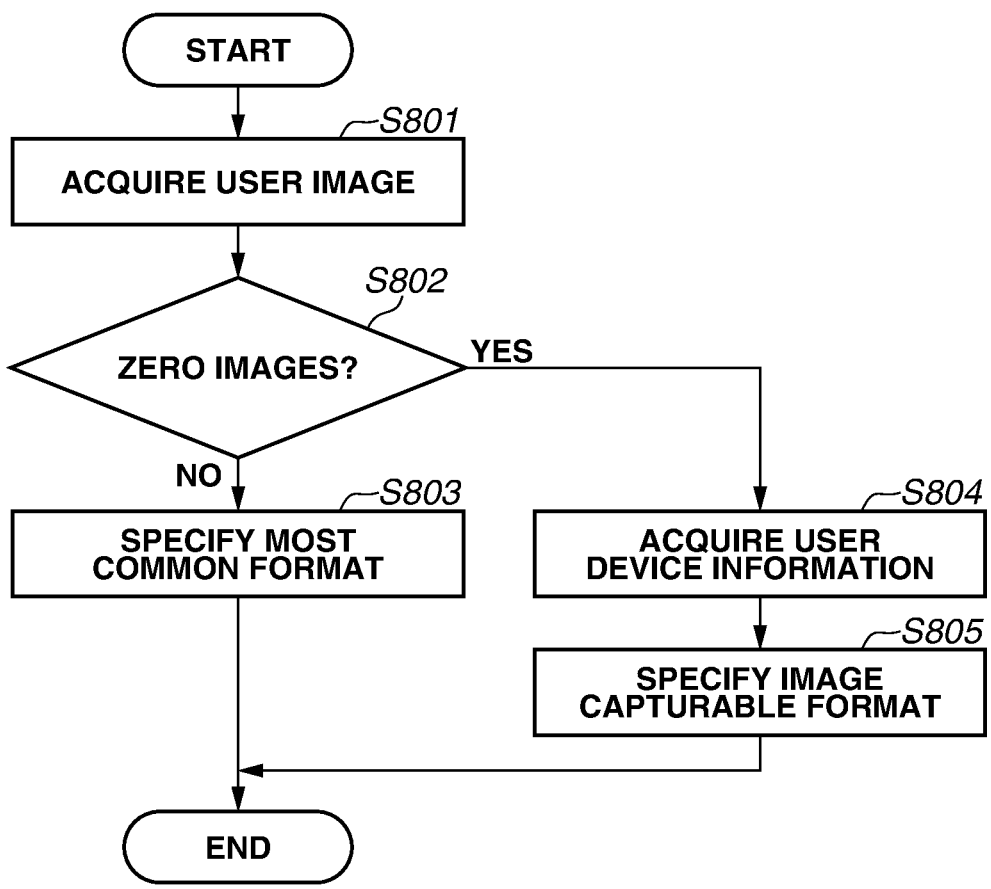
FIG. 8 is a flowchart of processing for specifying a user priority format according to the first exemplary embodiment.

Specific contents of the processing for specifying the user priority format in step S702 will now be described with reference to FIG. 8.

(Step S801)

In step S801, an image of the user is acquired based on the user ID 301 transmitted in step S701. The user use information management unit 106 inputs the command to request for image acquisition and the user ID 301 to the image storage unit 105, and acquires an image that matches the input user ID 301. The image storage unit 105 searches for the image that matches the user ID 301 using the image management table.

(Step S802)

In step S802, processing to be performed next is selected in accordance with the result in step S701. If zero images are acquired in step S801 (YES in step S802), the processing proceeds to step S804. If one or more images are acquired (NO in step S802), the processing proceeds to step S803.

(Step S803)

In step S803, the most common format of the images acquired in step S801 is specified. Specifically, the number of images of each format in the image management table is counted, and the most common format of the images is obtained. In the example of the image management table in FIG. 6, the most common format of user_001 is format_001.

(Step S804)

In step S804, information about a device relating to a user is acquired based on the user ID 301 transmitted in step S701. The user use information management unit 106 inputs a command to request for device information acquisition and the user ID 301 to the user storage unit 104, and acquires a device that matches the input user ID 301. The user storage unit 104 searches for the device relating to the user ID 301 by using the device management table.

(Step S805)

In step S805, an image capturable format is specified based on the information about the device acquired in step S804. Specifically, a value which is stored in the device management table as the image capturable format 403 is specified. In a case where a plurality of devices is related to the user, all of the image capturable formats 403 of the corresponding devices may be used as a result of the processing in step S805. Alternatively, a device to be used for the processing may be selected from the plurality of devices. In the case of the selection, the device to be used for the processing may be selected based on, for example, the last date and time the device has been used, and the date and time the device has been registered.

In step S803, the most common format of the images is specified, but the format that is used by the user frequently may be specified using another criterion. For example, a number of images is counted for each format, and a plurality of formats that ranks high may be specified. Alternatively, a format used when many images are registered during a specific period may be specified, based on the dates the images are registered. Alternatively, a specific format may be excluded. The specific format is excluded when abolishment of the specific format is determined and thus the format is not reflected in the processing.

The specification of the user priority format may also be performed by using both the information about the image relating to the user and the information about the device relating to the user. In this case, all the formats specified based on both the information about the image relating to the user and the information about the device relating to the user are used as the user priority formats. Alternatively, weights are assigned respectively to the information about the image relating to the user and the information about the device relating to the user, and any one information may be preferentially used.

Specific contents of processing for determining the display priority of transmission destinations in step S703 will now be described with reference to FIG. 9A.

(Step S901)

In step S901, the transmission destination priority determination unit 107 acquires information about transmission destinations from the transmission destination information management unit 108. The transmission destination information management unit 108 returns the information about the transmission destinations managed in the transmission destination management table.

(Step S902)

In step S902, a determination is made whether the format acquired in step S702 is adaptable to transmission to the respective transmission destinations acquired in step S901. Specifically, the determination is made whether the transmittable format 603 for each transmission destination includes the format acquired in step S702. If the format acquired in step S702 is adaptable to the transmission (YES in step S902), the processing proceeds to step S903. If the format is not adaptable to the transmission (NO in step S902), processing proceeds to step S904.

The determination for the transmittable format may be made by using other information about the transmission destinations and images. Examples of the other image information include a number of image pixels, a file size, and a reproduction time of a moving image.

(Step S903)

In step S903, display priority of transmission destinations is set to high. Through steps S902 and S903, transmission destinations to which the format acquired in step S702 can be transmitted have the high display priority.

(Step S904)

In step S904, a check is made whether processing on all the transmission destinations acquired in step S901 has been completed. If the processing on all the transmission destinations is completed (YES in step S904), a series of the processing is ended. If the processing on all the transmission destinations is not completed (NO in step S904), the processing in step S902 is performed on the next transmission destination.

In step S903, the display priority is expressed as high, but another method may be used for the expression. For example, the number of formats that are adaptable to the transmission determined in step S902 may be used as the display priority. In this case, as the number of the formats adaptable to the transmission is greater, the display priority becomes higher.

Specific contents of the processing for returning the list of transmission destinations performed in step S704 will now be described with reference to FIG. 9B.

In step S704, a list of transmission destinations illustrated in FIG. 9B is generated based on the result of the processing in step S703. FIG. 9B illustrates an example of JSON-format data to be returned to the display device 103. A "services" attribute includes information about a plurality of transmission destinations. Examples of an attribute of the transmission destination include an "id" attribute for uniquely identifying the transmission destination, a "name" attribute indicating a name of the transmission destination, and a "priority" attribute indicating the display priority of the transmission destination. In the example of FIG. 9B, as to the transmission destinations having high display priority in the processing in step S703, the "priority" attribute indicates 1. The attributes illustrated in FIG. 9B are merely examples, and the list of transmission destinations may include other information about the transmission destination. Examples of the other information include an explanation text of the transmission destination, an icon image of the transmission destination, and applicability of image transmission.

Figure 10:
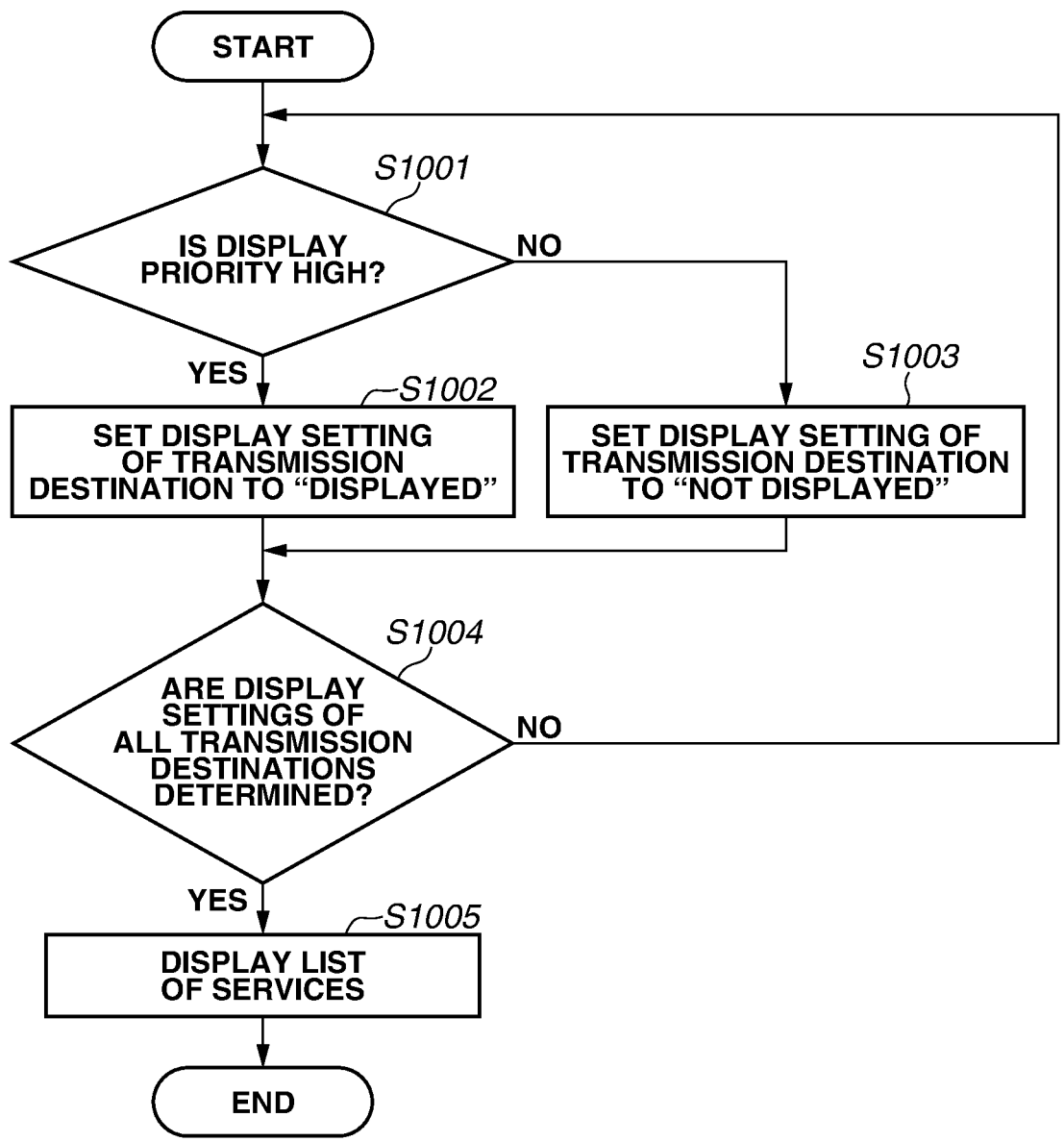
FIG. 10 is a flowchart of processing for displaying a list of transmission destinations according to the first exemplary embodiment.

Specific contents of the processing for displaying the list of the transmission destinations in step S705 will now be described with reference to FIG. 10.

(Step S1001)

In step S1001, processing is performed based on the display priority of the transmission destinations returned from the image management device 102 in step S704. If the display priority indicates high (YES in step S1001), the processing proceeds to step S1002. If the display priority does not indicate high (NO in step S1001), the processing proceeds to step S1003.

Determination whether processing in step S1002 is performed may be made based on whether the display priority exceeds a predetermined threshold.

(Step S1002)

In step S1002, display setting of a corresponding transmission destination is set to "displayed".

(Step S1003)

In step S1003, the display setting of the corresponding transmission destination is set to "not displayed".

(Step S1004)

In step S1004, a check is made whether the processing on all the transmission destinations returned from the image management device 102 in step S704 has been completed. If the processing on all the transmission destinations is completed (YES in step S1004), the processing proceeds to step S1005. If the processing on all the transmission destinations is not completed (NO in step S1004), the processing proceeds to step S1001 for the next transmission destination.
(Step S1005)

In step S1005, the list of the transmission destinations is displayed based on the display setting of the transmission destinations.

Figure 11A:
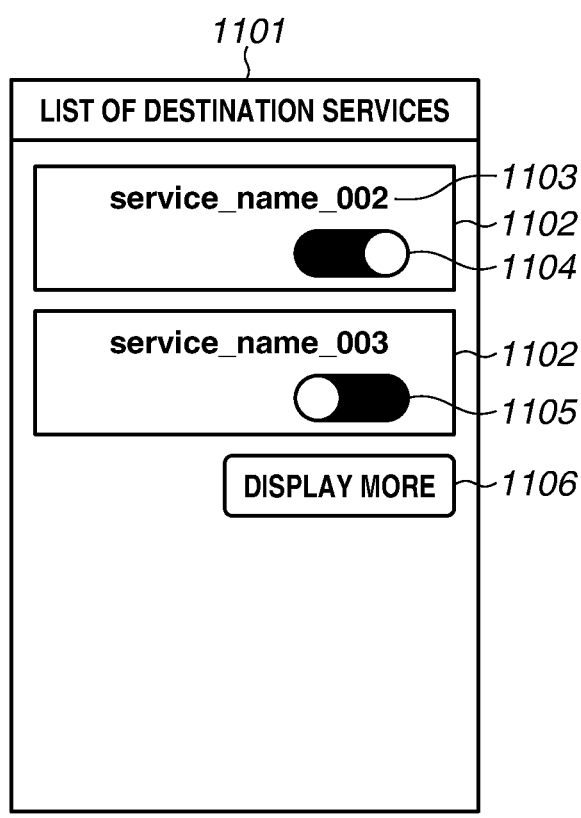
FIGS. 11A and 11B are diagrams illustrating display contents of the list of the transmission destinations according to the first exemplary embodiment.
Figure 11B:
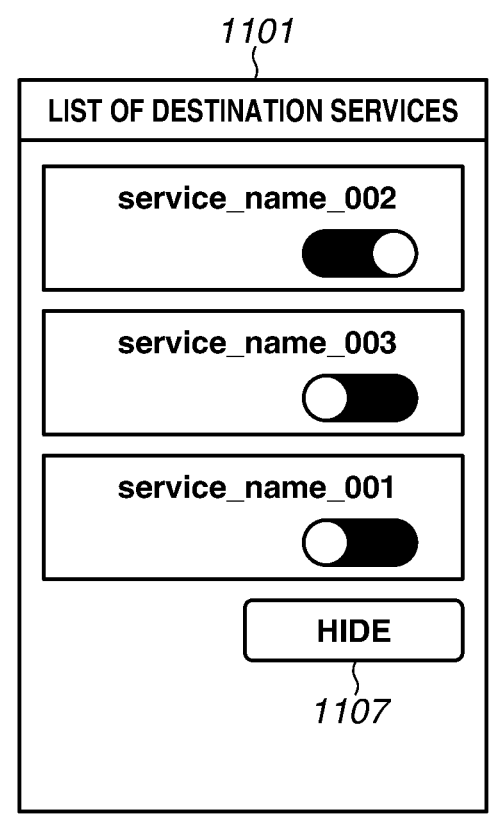

Display contents in step S1005 will be described below with reference to FIGS. 11A and 11B.

The transmission destination display unit 110 displays a transmission destination list frame 1101 indicating the list of transmission destinations. The transmission destination list frame 1101 includes a plurality of transmission destination frames 1102 respectively indicating the transmission destinations. The transmission destination frames 1102 each include a transmission destination name label 1103 indicating the name of the transmission destination, and a transmission destination cooperation status indicating whether the cooperation with the transmission destination is enabled. The transmission destination cooperation status includes two kinds of statuses, e.g., a transmission destination enabled status 1104 and a transmission destination disabled status 1105. The user uses a button in the transmission destination cooperation status to enable switching the cooperation with the transmission destination between enable and disable.

The transmission destination list frame 1101 further includes an additional display button 1106. In step S1002, only a transmission destination for which display setting indicates "displayed" is displayed in the transmission destination list frame 1101. When the user presses the additional display button 1106, a transmission destination that has set to "not displayed" in step S1003 is additionally displayed. FIG. 11A illustrates display before the additional display button 1106 is pressed, and FIG. 11B illustrates display after the additional display button 1106 is pressed. When the additional display button 1106 is pressed, a hide button 1107 is displayed instead of the additional display button 1106. The hide button 1107 is used not to display again the display destination set to "not displayed".

The transmission destinations may be displayed with another method depending on the priority of the transmission destinations. For example, positions where the transmission destinations are displayed may be changed or the display colors of the transmission destination frames 1102 may be changed in accordance with a difference in the display priority. Further, a transmission destination having low display priority may not be displayed.

Figures 12A, 12B:
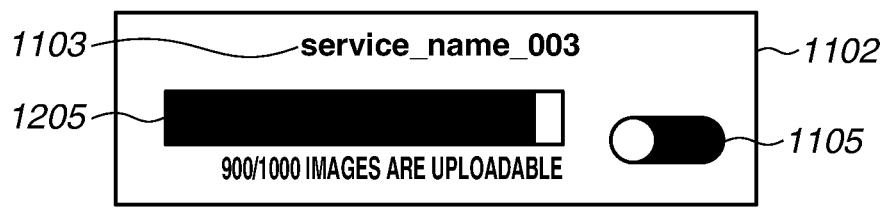
FIGS. 12A and 12B are diagrams illustrating display contents of the list of the transmission destinations including number-of-image information according to the first exemplary embodiment.

In step S1005, the number of images transmittable to the transmission destinations out of the images relating to the user may further be displayed. In step S704, the information illustrated in FIG. 12A is assumed to be returned from the image management device 102. The information illustrated in FIG. 12A includes the total number of images relating to the user as "user_image_count". The information illustrated in FIG. 12A further includes the number of the images transmittable to the transmission destinations as "uploadable_image_count". The information about the total number of the images relating to the user and the number of the images transmittable to the transmission destinations is displayed as a part of the transmission destination frame 1102. FIG. 12B illustrates an example of the display in the transmission destination frame 1102.

The transmission destination frame 1102 includes the number-of-transmittable image display 1205. The number-of-transmittable image display 1205 includes a ratio between the number of the images transmittable to the transmission destination and the total number of images relating to the user. Information about the actual number of images is also displayed as text information. The display in the number-of-transmittable image display 1205 is an example, and the ratio between the number of the images transmittable to the transmission destinations and the total number of the images relating to the user may be displayed in another format. Further, only the number of the images transmittable to the transmission destination may be displayed.

As described above, the information processing system 101 according to the present exemplary embodiment can control the display of transmission destinations that are transmission destinations of images, in accordance with the priority calculated from the information about an image or a device relating to a user. This enables the user to easily select a service being subject to the cooperative function without performing a complicated operation to acquire the properties of services of the transmission destinations.

In a second exemplary embodiment, in a case where user use information about an information processing system is changed, a user is recommended to change a transmission destination. The present exemplary embodiment includes a configuration partially similar to the configuration in the first exemplary embodiment, and thus a difference from the first exemplary embodiment will be described.

Figure 13:
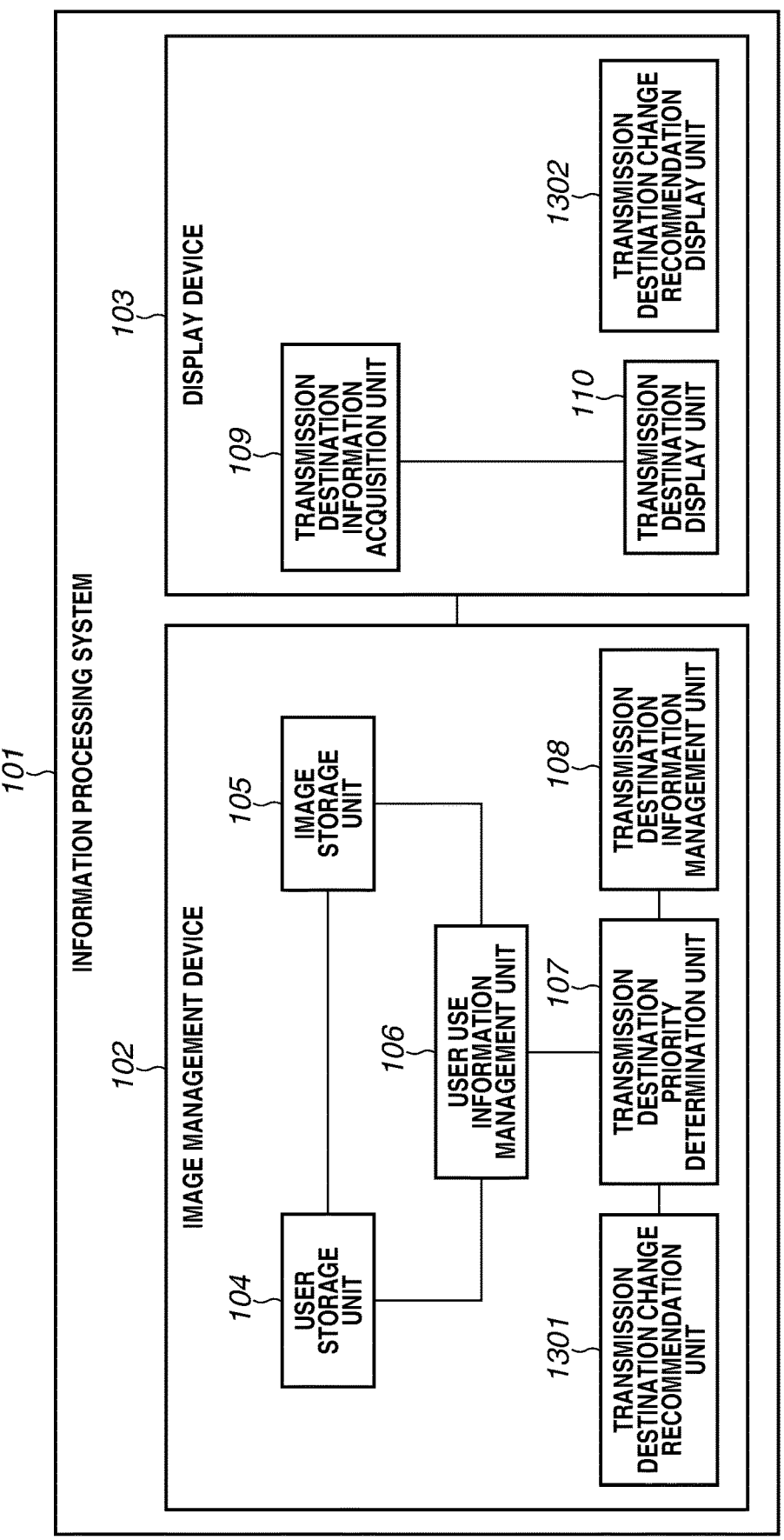
FIG. 13 is block diagram illustrating a configuration of an information processing system according to a second exemplary embodiment.

A configuration of an information processing system 101 according to the present exemplary embodiment will be described with reference to FIG. 13. An image management device 102 according to the present exemplary embodiment further includes a transmission destination change recommendation unit 1301. A display device 103 according to the present exemplary embodiment further includes a transmission destination change recommendation display unit 1302. The transmission destination change recommendation unit 1301 of the mage management device 102 transmits information for transmission destination change recommendation to the display device 103. The display device 103 then displays the received information by using the transmission destination change recommendation display unit 1302.

Information that is managed by a user storage unit 104 according to the present exemplary embodiment will now be described with reference to FIGS. 14A and 14B. The user storage unit 104 stores information about a user of the information processing system 101, in a user management table of FIG. 14A. A priority format 1401 is further stored in the user management table. The priority format 1401 is the information specified in the processing in step S702. The user storage unit 104 stores priority of transmission destinations for respective users, in a transmission destination priority management table. The transmission destination priority management table stores a user ID 301, a service ID 601, and display priority 1402.

Specific contents of processing for recommending transmission destination change in the transmission destination change recommendation unit 1301 of the image management device 102 will be described with reference to FIG. 15A.

(Step S702 and Step S703)

As described in the first exemplary embodiment, in step S703, the display priority of transmission destinations is determined again based on the format specified in step S702.

(Step S1501)

In step S1501, a determination is made whether the transmission destination change is recommended, based on the display priority determined in step S703 and the display priority 1402 stored in the transmission destination priority management table. If the transmission destination change is recommended (YES in step S1501), the processing proceeds to step S1502.

If the transmission destination change is not recommended (NO in step S1501), the series of the processing is ended.

The display priority determined in step S703 is compared with the display priority 1402 stored in the transmission destination priority management table. If the display priority of any transmission destination increases, it is determined that the transmission destination change is recommended. Alternatively, a threshold is set in an increased range of the display priority, and if the increased range exceeds the threshold, it may be determined that the change is recommended.

Further, a check is made whether the cooperation with the transmission destination recommended to be changed has been already enabled, by using information about a connected service 304 in the user management table. If the cooperation has been already enabled, it is determined that the transmission destination change is not recommended.
(Step S1502)

Figures 15A, 15B:
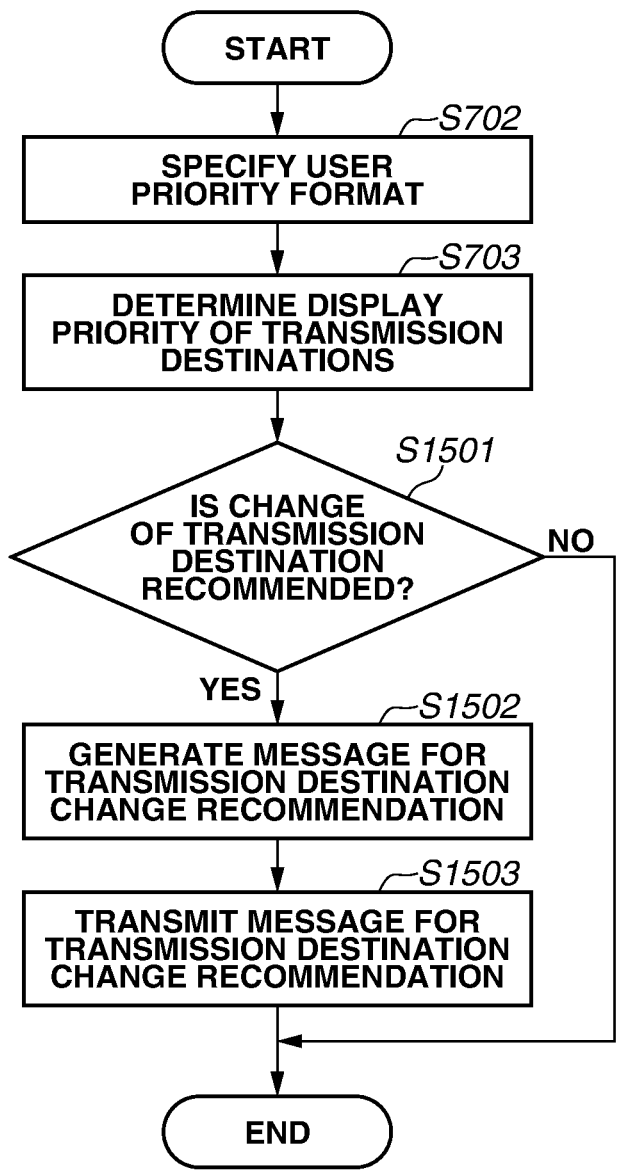
FIG. 15A is a flowchart of processing for recommending transmission destination change according to the second exemplary embodiment.
FIG. 15B illustrates a message for recommending the transmission destination change.

In step S1502, a message to recommend the transmission destination change illustrated in FIG. 15B is generated. The message to recommend the transmission destination change includes information about a transmission destination currently enabled as an "enabled_service" attribute. The message further includes information about the transmission destination recommended to be changed as a "suggested_service" attribute. The "enabled_service" attribute and the "suggested_service" attribute each may include an "uploadable_image_count" attribute indicating the number of images transmittable to the transmission destination. Note that the message to recommend the transmission destination change is an example, and the attribute names are merely examples. Thus, other attribute names may be used.
(Step S1503)

In step S1503, the message to recommend the transmission destination change generated in step S1502 is transmitted to the display device 103.

The processing illustrated in FIG. 15A may be performed at any timing. The processing may also be performed at regular intervals, or at timing of registering new information about a transmission destination in the transmission destination information management unit 108. The processing may also be performed at timing of updating the existing information about the transmission destination in the transmission destination information management unit 108. The processing may be performed at timing of registering information about a new device relating to a user in the user storage unit 104. The processing may be performed at timing of registering or deleting a predetermined number of images relating to a user in or from the image storage unit 105. Further, the processing may be performed when the user starts operating the display device 103. Further, the display device 103 may display the message to recommend the transmission destination change immediately upon reception of the message, or may display the message when a specific operation of the display device 103 is performed.

Further, the display device 103 may make an inquiry of the image management device 102 about whether the message to recommend the transmission destination change is present, at any timing.

Figure 16:
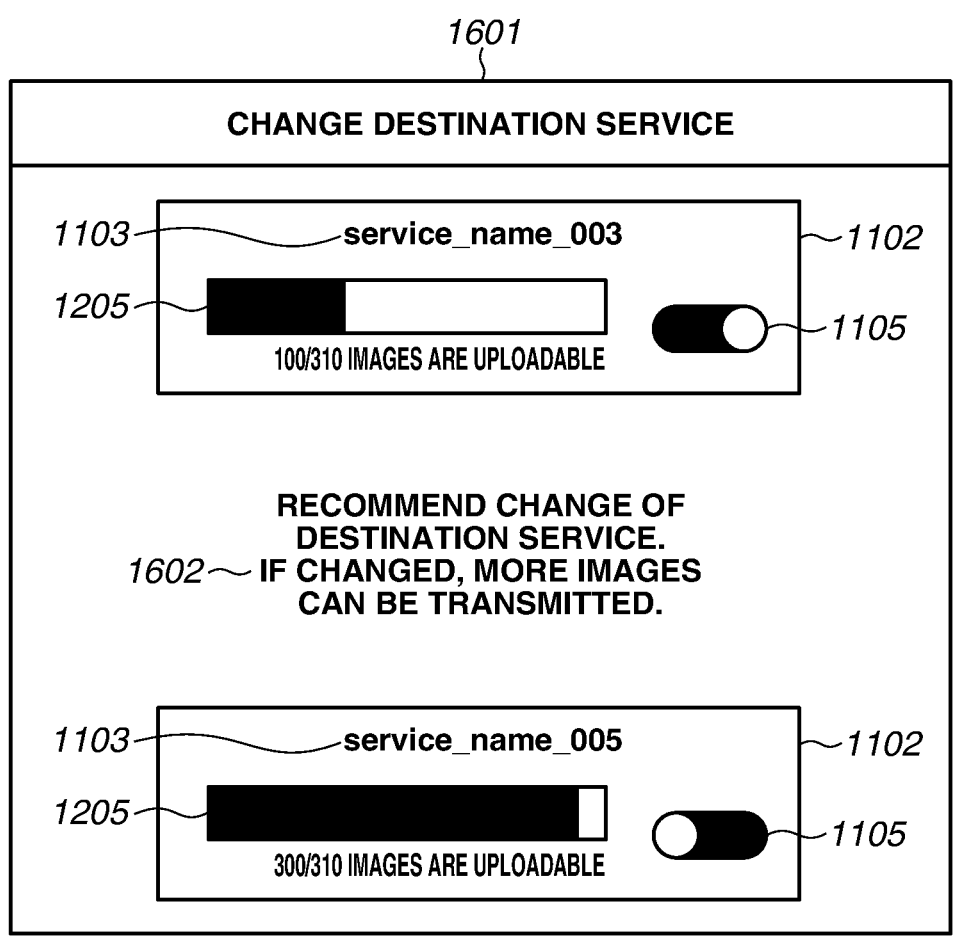
FIG. 16 is a diagram illustrating display contents of the transmission destination change recommendation in the second exemplary embodiment.

Contents of the display in the transmission destination change recommendation display unit 1302 of the display device 103 will now be described with reference to FIG. 16.

The transmission destination change recommendation display unit 1302 displays a transmission destination recommendation frame 1601 indicating display of the transmission destination change recommendation. The transmission destination recommendation frame 1601 displays a transmission destination currently enabled and a transmission destination recommended to be changed in the transmission destination frame 1102. The transmission destination recommendation frame 1601 further displays the recommendation message 1602 indicating details about the transmission destination change. In a case where a plurality of the transmission destinations currently enabled or a plurality of the transmission destinations recommended to be changed is present, a plurality of the transmission destination frames 1102 may be displayed.

As described above, the information processing system according to the present exemplary embodiment can recommend the user to change a transmission destination, in accordance with a change in utilization of a user. This enables the user to easily change a service being subject to the cooperative function even if a tendency of an image or a device changes while the user continues using the information processing system.

For a third exemplary embodiment, a configuration including only an image management device will be described. The present exemplary embodiment includes a configuration similar to the configuration used in the first exemplary embodiment, and thus a difference from the first exemplary embodiment will be described.

Figure 17:
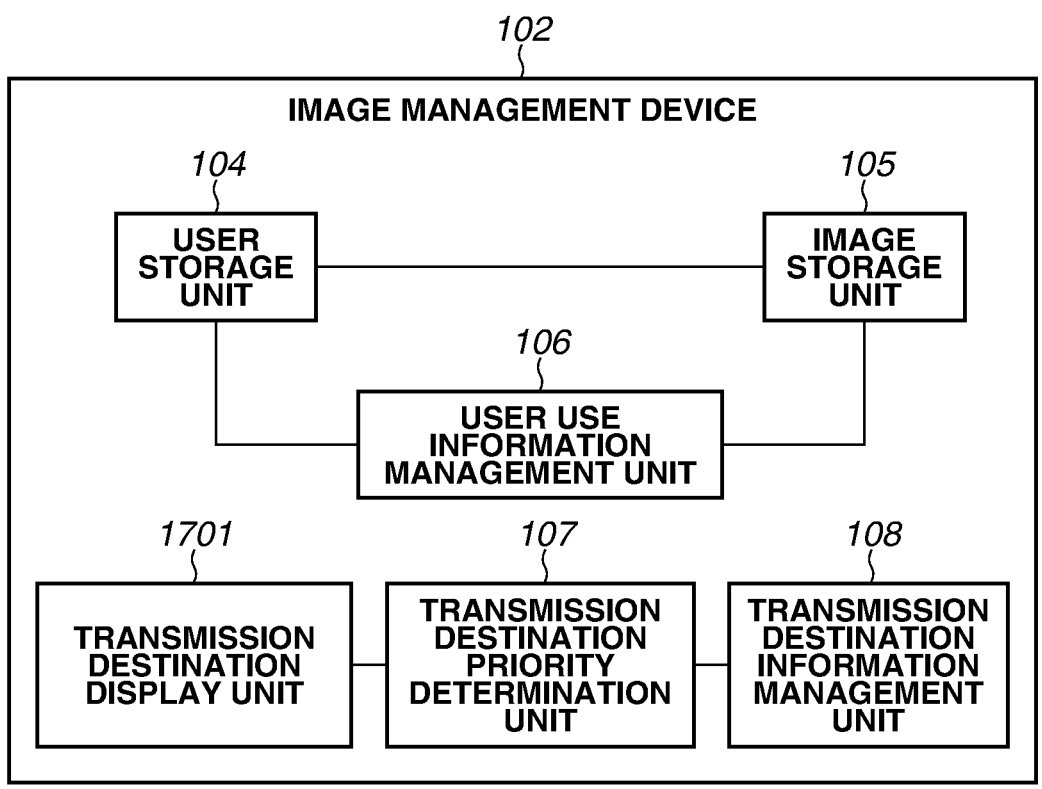
FIG. 17 is a block diagram illustrating a configuration of an image management device according to a third exemplary embodiment.

FIG. 17 illustrates a configuration of the image management device according to the present exemplary embodiment. The image management device according to the present exemplary embodiment further includes a transmission destination display unit 1701. The transmission destination display unit 1701 displays the list of transmission destinations returned in step S704. The transmission destination display unit 1701 performs the processing in step S705, and displays the list of transmission destinations.

Figure 18:
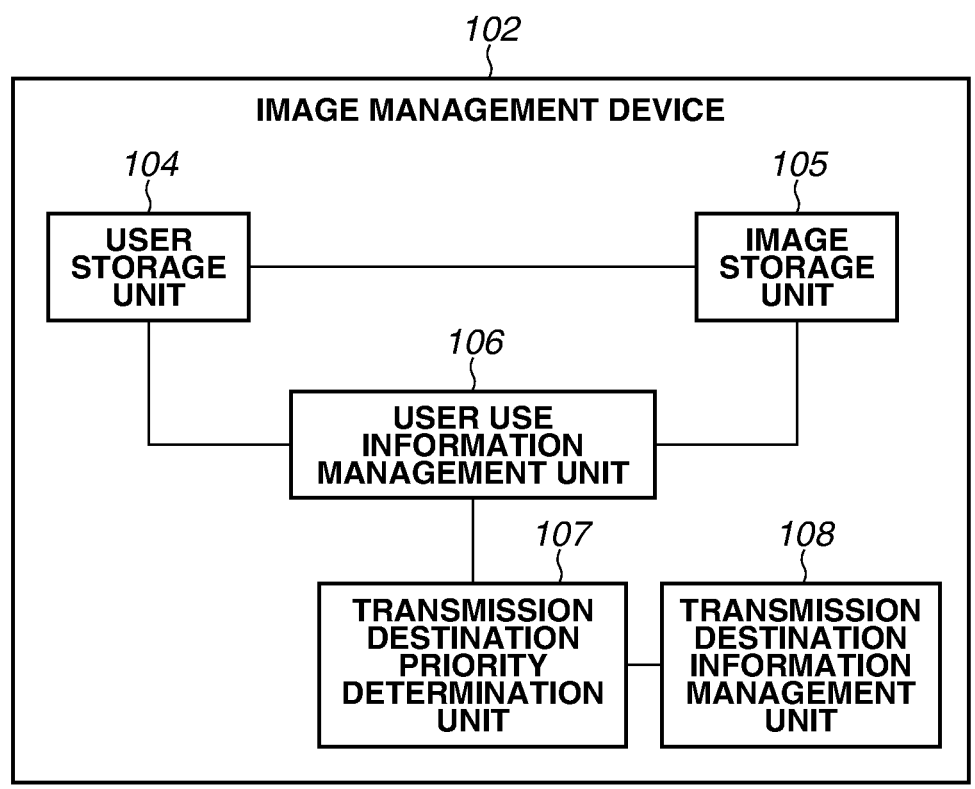
FIG. 18 is a block diagram illustrating a configuration of an image management device according to another exemplary embodiment.

As described above, the image management device according to the present exemplary embodiment enables the display of transmission destinations without providing an additional device for display. As illustrated in FIG. 18, the configuration may include only the image management device according to the first exemplary embodiment. This configuration enables the image management device to determine the display priority of transmission destinations. The image management device can use the determined display priority for other processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-165582, filed Oct. 7, 2021, which is hereby incorporated by reference herein in its entirety.

What is claimed is:

1. An information processing device configured to transmit images of a user to information management services, the information processing device comprising:
   at least one processor; and
   at least one memory including computer-readable instructions stored thereon that, when executed by the at least one processor, cause the at least one processor to function as:
   a display control unit configured to display information indicating one of the information management services as a transmission destination of the images, wherein the one of the information management services as the transmission destination of the images is determined based on an image format of at least one image which is, among the images, compatible with an image format associated with the one of the information management services; and
   a transmission unit configured to transmit the images to the transmission destination in accordance with an operation performed by the user,
   wherein the display control unit determines, as an information management service being hidden, the other information management services which is not able to receive an image in any of image formats of the images of the user, and displays the information indicating the one of the information management services as the transmission destination with a ratio of the number of images transmittable to one of the information management services to the total number of the images of the user and without the information indicating the information management service being hidden.

2. The information processing device according to claim 1, wherein the instructions cause the at least one processor to further function as:
   a registration unit configured to register the image; and
   a display configured to be caused to perform display by the display control unit.

3. The information processing device according to claim 1, wherein the information about the user includes at least one of a number of the images registered by a registration unit for each format and information about an image capturing device relating to the user.

4. The information processing device according to claim 1, wherein the display control unit displays applicability of transmission of the image to the information management service in accordance with the information about the user.

5. The information processing device according to claim 1, wherein the information indicating the information management service includes an icon image indicating the information management service.

6. The information processing device according to claim 1,
   wherein the information indicating the information management service includes information indicating a plurality of the information management services, and
   wherein the display control unit displays the information indicating the plurality of the information management services.

7. The information processing device according to claim 6, wherein the display control unit displays some of the plurality of the information management services differently in accordance with the information about the user.

8. The information processing device according to claim 7, wherein the display control unit does not display some of the plurality of the information management services in accordance with the information about the user.

9. The information processing device according to claim 6, wherein the instructions cause the at least one processor to further function as
   a calculation unit that calculates priority of the plurality of the information management services based on the information about the user,
   wherein the display control unit displays the plurality of the information management services differently in accordance with the priority.

10. The information processing device according to claim 9, wherein the calculation unit updates the priority of the plurality of the information management services.

11. An information processing method for transmitting images of a user to information management services, the information processing method comprising:
    performing control to display information indicating one of the information management services as a transmission destination of the images, wherein the one of the information management services as the transmission destination of the images is determined based on an image format of at least one image which is, among the images, compatible with an image format associated with the one of the information management services; and
    transmitting the images to the transmission destination in accordance with an operation performed by the user,
    wherein determine, as an information management service being hidden, the other information management services which is not able to receive an image in any of image formats of the images of the user, and in the control to display the information indicating the one of the information management services as the transmission destination with a ratio of the number of images transmittable to one of the information management services to the total number of the images of the user and without the information indicating the information management service being hidden.

12. A non-transitory storage medium storing a program causing an information processing device configured to transmit images of a user to information management services to execute an information processing method, the information processing method comprising:

performing control to display information indicating one of the information management services as a transmission destination of the images, wherein the one of the information management services as the transmission destination of the images is determined based on an image format of at least one image which is, among the images, compatible with an image format associated with the one of the information management services; and transmitting the images to the transmission destination in accordance with an operation performed by the user, wherein determine, as an information management service being hidden, the other information management services which is not able to receive an image in any of image formats of the images of the user, and in the control to display the information indicating the one of the information management services as the transmission destination with a ratio of the number of images transmittable to one of the information management services to the total number of the images of the user and without the information indicating the information management service being hidden.

* * * * *